(12) United States Patent
Lee et al.

(10) Patent No.: US 11,292,362 B2
(45) Date of Patent: Apr. 5, 2022

(54) SYSTEM AND METHOD FOR INCREASING TEMPERATURE OF BATTERY USING MOTOR DRIVING SYSTEM

(71) Applicants: HYUNDAI MOTOR COMPANY, Seoul (KR); KIA MOTORS CORPORATION, Seoul (KR)

(72) Inventors: Yong Jae Lee, Hwaseong-si (KR); Su Hyun Bae, Daegu (KR); Jung Mo Yu, Seoul (KR); Jae Ho Hwang, Daejeon (KR); Joo Young Park, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 142 days.

(21) Appl. No.: 16/774,362

(22) Filed: Jan. 28, 2020

(65) Prior Publication Data
US 2021/0061128 A1    Mar. 4, 2021

(30) Foreign Application Priority Data
Aug. 30, 2019    (KR) .......................... 10-2019-0107408

(51) Int. Cl.
*H02J 7/00* (2006.01)
*B60L 58/25* (2019.01)
(Continued)

(52) U.S. Cl.
CPC ............. *B60L 58/25* (2019.02); *B60L 15/025* (2013.01); *B60L 15/20* (2013.01); *B60L 2240/545* (2013.01)

(58) Field of Classification Search
USPC .......................... 320/128, 150, 151, 152, 153
See application file for complete search history.

(56) References Cited

U.S. PATENT DOCUMENTS

| | | | |
|---|---|---|---|
| 2009/0058337 A1* | 3/2009 | Kato ........................ | B60L 50/16 318/400.09 |
| 2009/0146612 A1* | 6/2009 | Oyobe .................... | B60L 50/16 320/138 |

(Continued)

FOREIGN PATENT DOCUMENTS

| | | |
|---|---|---|
| CN | 108666713 A | 10/2018 |
| CN | 108682909 A | 10/2018 |

(Continued)

*Primary Examiner* — Brian Ngo
(74) *Attorney, Agent, or Firm* — Lempia Summerfield Katz LLC (57) ABSTRACT

A system for increasing a temperature of a battery includes an inverter including a plurality of legs each including one pair of switching devices connected in series to each other between opposite ends of the battery and corresponding to a plurality of phases, respectively, a motor including a plurality of coils corresponding to the plurality of phases, respectively, where one end of each of the plurality of coils is connected to a connection node between one pair of switching devices included in a corresponding leg and other ends of the coils are connected to each other, and a controller configured to select two phases of the plurality of phases, and to alternately control an on/off state of switching devices included in two legs in the inverter, corresponding to the two selected phases, at a preset switching frequency to generate alternating current (AC) supplied to the battery.

20 Claims, 4 Drawing Sheets

(51) Int. Cl.
*B60L 15/20* (2006.01)
*B60L 15/02* (2006.01)

(56) References Cited

U.S. PATENT DOCUMENTS

| | | | | |
|---|---|---|---|---|
| 2010/0134053 A1* | 6/2010 | Yamada | ............ | H02M 7/53875 |
| | | | | 318/162 |
| 2012/0068641 A1* | 3/2012 | Imura | .................... | H02P 21/13 |
| | | | | 318/400.02 |
| 2012/0323430 A1* | 12/2012 | Nakamura | .............. | B60L 50/51 |
| | | | | 701/22 |
| 2015/0015171 A1* | 1/2015 | Nishibata | ................ | H02P 29/50 |
| | | | | 318/400.15 |
| 2016/0294317 A1* | 10/2016 | Nakai | ..................... | H02P 21/14 |
| 2016/0329856 A1* | 11/2016 | Shoda | ................... | H02P 27/085 |
| 2017/0187320 A1* | 6/2017 | Kanie | ................. | H02M 7/5395 |
| 2019/0280636 A1* | 9/2019 | Ohta | ....................... | H02M 7/44 |

FOREIGN PATENT DOCUMENTS

| | | | |
|---|---|---|---|
| CN | 108705943 | A | 10/2018 |
| CN | 108711662 | A | 10/2018 |
| CN | 108736107 | A | 11/2018 |
| CN | 108736108 | A | 11/2018 |
| CN | 108878996 | A | 11/2018 |
| CN | 108879027 | A | 11/2018 |
| JP | 2007-026700 | A | 2/2007 |
| JP | 2012-165526 | A | 8/2012 |
| JP | 2014-072955 | A | 4/2014 |
| JP | 2015-213390 | A | 11/2015 |
| JP | 2016-004649 | A | 1/2016 |
| KR | 10-2011-0112132 | A | 10/2011 |
| KR | 10-1358367 | B1 | 2/2014 |

* cited by examiner

SYSTEM AND METHOD FOR INCREASING TEMPERATURE OF BATTERY USING MOTOR DRIVING SYSTEM

CROSS-REFERENCE TO RELATED APPLICATION

This application claims priority to and the benefit of Korean Patent Application No. 10-2019-0107408, filed Aug. 30, 2019, which is incorporated herein by reference in its entirety.

FIELD

The present disclosure relates to a system and method for increasing a temperature of a battery used in a motor driving system of a vehicle.

BACKGROUND

The statements in this section merely provide background information related to the present disclosure and may not constitute prior art.

In general, an eco-friendly vehicle driven by electrical energy includes a battery for storing electrical energy, an inverter for converting the electrical energy stored in the battery into alternating current (AC) having a plurality of phases, and a motor for generating kinetic energy for rotation using the AC converted by the inverter.

Recently, a lithium ion battery has been mainly used for an eco-friendly vehicle. The lithium ion battery has excellent performance by virtue of excellent energy density, and charge and discharge cycle at room temperature. However, due to the properties of electrolyte included in the lithium ion battery, it is disadvantageous in terms of reduced capacity, increased resistance, and reduced efficiency at low temperatures. In particular, when the lithium ion battery is charged or overcharged at a low temperature, lithium ions are irregularly deposited on a surface of a negative electrode, thereby reducing the lifespan of the battery. Due to this issue, the lithium ion battery desires a temperature-increasing device for rapidly increasing the temperature thereof from a low-temperature state to a high-temperature state with high efficiency.

Conventionally, there is a method of additionally installing a heater (e.g., a positive temperature coefficient (PTC) heater) in a battery and directly heating the battery or heating and circulating coolant supplied to the battery. However, in a conventional battery temperature-increasing method, we have discovered that a separate heater needs to be additionally installed in the battery and the added separate heater in the battery increases the additional costs and volume of the battery.

As another conventional battery temperature-increasing method, research has been conducted into a method of generating heat in a battery in an electrical manner. In this method, the internal resistance of a battery is used to enable current to flow in the battery, and loss generated in proportion to the amount of flowing current is used as heat. This method has advantages in that current uniformly flows in the battery to uniformly generate heat in the battery, but we have discovered that this method needs to use a separate dedicated circuit for enabling current to flow in the battery, so that the volume and costs of the battery additionally increase and an additional management point is created with respect to the dedicated circuit for generating current for increasing a temperature of the battery and enabling the current to flow in the battery, thereby complicating the maintenance of a vehicle.

The above information disclosed in this Background section is only for enhancement of understanding of the background of the present disclosure, and therefore it may contain information that does not form the prior art that is already known to a person of ordinary skill in the art.

SUMMARY

The present disclosure provides a system for increasing a temperature of a battery used in a motor driving system. The system includes an inverter including a plurality of legs each including one pair of switching devices connected in series to each other between opposite ends of the battery and corresponding to a plurality of phases, respectively, a motor including a plurality of coils corresponding to the plurality of phases, respectively, one end of each of the plurality of coils being connected to a connection node between the pair of switching devices included in a corresponding leg and other ends of the coils being connected to each other, and a controller configured to select two phases of the plurality of phases, and to generate alternating current (AC) supplied to the battery by alternately controlling an on/off state of the pair of switching devices included in each of two legs in the inverter, corresponding to the two selected phases, at a preset switching frequency.

The controller may control the on/off state of a first pair of switching devices included in a first leg corresponding to one phase of the two selected phases to have a complementary relationship at the switching frequency and control the on/off state of a second pair of switching devices included in a second leg corresponding to a remaining phase of the two selected phases to have the complementary relationship at the switching frequency, and the controller may control the on/off state of one of the first pair of switching devices connected to a positive terminal of the battery in the first leg and the on/off state of one of the second pair of switching devices connected to the positive terminal of the battery in the second leg to have the complementary relationship.

The controller may turn off a third pair of switching devices included in a third leg corresponding to a phase other than the two selected phases.

The system may further include a rotor position sensor configured to detect a rotor angle of the motor, wherein the controller may select two phases of the plurality of phases based on the rotor angle.

The controller may select two phases for reducing a difference between the rotor angle and an angle of AC generated by control of the pair of switching devices included in each of the legs corresponding to two phases among the plurality of phases, and the angle of the AC is indicated on a dq rest frame.

In accordance with another aspect of the present disclosure, a system for increasing a temperature of a battery used in a motor driving system includes an inverter including an a-phase leg, a b-phase leg, and a c-phase leg each including one pair of switching devices connected in series to each other between opposite ends of the battery, a motor including an a-phase coil having one end connected to a connection node between a first pair of switching devices included in the a-phase leg, a b-phase coil having one end connected to a connection node between a second pair of switching devices included in the b-phase leg, and a c-phase coil having one end connected to a connection node between a third pair of switching devices included in the c-phase leg, another end of the a-phase coil, another end of the b-phase coil, and another end of the c-phase coil being connected to each other, and a controller configured to select two legs among the a-phase leg, the b-phase leg, and the c-phase leg, and to generate AC supplied to the battery by alternately controlling an on/off state of the pair of switching devices included in the selected legs at a preset switching frequency.

The controller may control the on/off state of one pair of switching devices included in one leg of the selected legs to have a complementary relationship at the switching frequency and controls the on/off state of one pair of switching devices included in a remaining leg of the selected legs to have a complementary relationship at the switching frequency, and the controller may control the on/off state of one of the pair of switching devices connected to a positive terminal of the battery in each of the two selected legs to have a complementary relationship.

The controller may turn off one pair of switching devices included in one leg that is not selected.

The system may further include a rotor position sensor configured to detect a rotor angle of the motor, wherein the controller may select two legs based on the rotor angle.

The controller may select two of the phase legs for reducing a difference between the rotor angle and an angle of AC generated by control of the first and second pair of switching devices included in each of the a-phase leg and the b-phase leg, AC generated by control of the second and third pair of switching devices included in each of the b-phase leg and the c-phase leg, and AC generated by control of the third and first pair of switching devices included in each of the c-phase leg and the a-phase leg, and the angle of the AC is indicated on a dq rest frame.

When the rotor angle is 0° to 60° and 180° to 240°, the controller may select the c-phase leg and the a-phase leg, may alternately control the on/off state of the third and first pair of switching devices included in each of the c-phase leg and the a-phase leg at the preset switching frequency, and may turn off the second pair of switching devices included in the b-phase leg to generate the AC.

When the rotor angle is 60° to 120° and 240° to 300°, the controller may select the b-phase leg and the c-phase leg, may alternately control the on/off state of the second and third pair of switching devices included in each of the b-phase leg and the c-phase leg at the preset switching frequency, and may turn off the first pair of switching devices included in the a-phase leg to generate the AC.

When the rotor angle is 120° to 180° and 300° to 360°, the controller may select the a-phase leg and the b-phase leg, may alternately control the on/off state of the first and second pair of switching devices included in each of the a-phase leg and the b-phase leg at the preset switching frequency, and may turn off the third pair of switching devices included in the c-phase leg to generate the AC.

In accordance with another aspect of the present disclosure, a method of increasing a temperature of a battery using the system above includes the steps of determining a section to which the rotor angle belongs, determining one of the legs maintained in an off state based on the section to which the rotor angle belongs, and generating the AC by alternately controlling an on/off state of the pair of switching devices included in two legs other than the leg maintained in the off state at the switching frequency.

The step of determining may be performed when the rotor angle is 0° to 60° and 180° to 240°. The step of determining may include the step of turning off the second pair of switching devices included in the b-phase leg, and the step of generating may include the step of generating the AC by alternately controlling the on/off state of the third and first pair of switching devices included in each of the c-phase leg and the a-phase leg at the preset switching frequency.

The step of generating may include the step of controlling the on/off state of the third pair of switching devices included in the c-phase leg to have a complementary relationship at the switching frequency, and controlling the on/off state of the first pair of switching devices included in the a-phase leg to have a complementary relationship at the switching frequency, and controlling the on/off state of one of the third pair of switching devices connected to the positive terminal of the battery in the c-phase leg and the on/off state of one of the first pair switching devices connected to the positive terminal of the battery in the a-phase leg to have a complementary relationship at the switching frequency.

The step of determining may be performed when the rotor angle is 60° to 120° and 240° to 300°. The step of determining may include the step of turning off the first pair of switching devices included in the a-phase leg, and the step of generating may include the step of generating the AC by alternately controlling the on/off state of the second and third pair of switching devices included in each of the b-phase leg and the c-phase leg at the preset switching frequency.

The step of generating may include the steps of controlling the on/off state of the second pair of switching devices included in the b-phase leg to have a complementary relationship at the switching frequency, controlling the on/off state of the third pair of switching devices included in the c-phase leg to have a complementary relationship at the switching frequency, and controlling the on/off state of one of the second pair of switching devices connected to a positive terminal of the battery in the b-phase leg and the on/off state of one of the third pair of switching devices connected to the positive terminal of the battery in the c-phase leg to have a complementary relationship at the switching frequency.

The step of determining may be performed when the rotor angle is 120° to 180° and 300° to 360°. The step of determining may include the step of turning off the third pair of switching devices included in the c-phase leg, and the step of generating may include the step of generating the AC by alternately controlling the on/off state of the first and second pair of switching devices included in each of the a-phase leg and the b-phase leg at the preset switching frequency.

The step of generating may include the steps of controlling the on/off state of the first pair of switching devices included in the a-phase leg to have a complementary relationship at the switching frequency, controlling the on/off state of the second pair of switching devices included in the b-phase leg to have a complementary relationship at the switching frequency, and controlling on/off state of one of the first pair of switching devices connected to a positive terminal of the battery in the a-phase leg and the on/off state of one of the second pair of switching devices connected to the positive terminal of the battery in the b-phase leg to have a complementary relationship at the switching frequency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a system for increasing a temperature of a battery used in a motor driving system according to exemplary forms of the present disclosure will be described with reference to the accompanying drawings.

Figure 1:
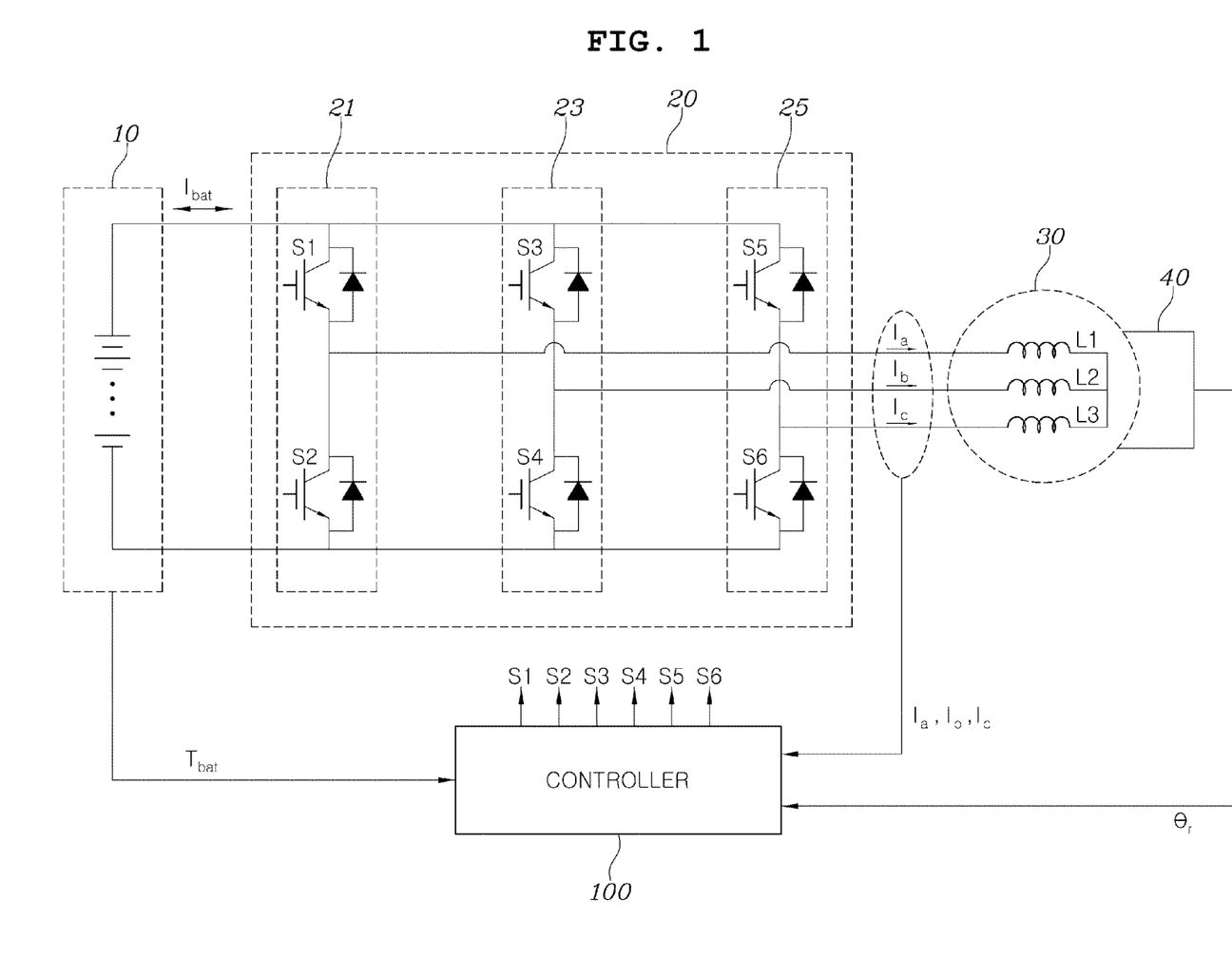
FIG. 1 is a circuit diagram of a system for increasing a temperature of a battery used in a motor driving system according to a form of the present disclosure.

FIG. 1 is a circuit diagram of a system for increasing a temperature of a battery used in a motor driving system according to a form of the present disclosure.

As shown in FIG. 1, a general system for driving a motor 30 may include a battery 10, which is an energy storage device for storing power for driving the motor 30, and an inverter 20 for converting direct current (DC) stored in the battery 10 into alternating current (AC) having a plurality of phases and providing the converted AC to the motor 30. The inverter 20 may include a plurality of legs 21, 23, and 25 that are connected in parallel to each other at opposite ends of the battery 10, each of the legs 21, 23, and 25 may have two switching devices (two of S1 to S6) that are connected in series to each other, and a connection node of the two switching devices may supply driving power of one phase to the motor 30. In order to drive the motor, pulse width modulation control of switching devices S1 to S6 in the inverter 20 may be performed to supply current to the motor 30 in an amount corresponding to a current reference corresponding to torque of the motor 30, which is to be acquired by driving the motor 30.

The system for increasing a temperature of a battery used in a motor driving system according to a form of the present disclosure may control states of the switching devices S1 to S6 of the inverter 20 to supply AC (pulsating current) to the battery 10 while suppressing torque generated by the motor 30 using such a general motor driving system.

In detail, the system for increasing a temperature of a battery used in a motor driving system according to a form of the present disclosure may include the battery 10, the inverter 20 having the plurality of legs 21, 23, and 25 each including one pair of the switching devices S1 to S6, which are connected in series to each other at opposite ends of the battery 10, the motor 30 having a plurality of coils L1, L2, and L3 that are respectively connected to the connection nodes of the switching devices included in the legs 21, 23, and 25 in the inverter 20, and a controller 100 for controlling states of the connected inverter 20 and states of the switching devices included in two of the plurality of legs in the inverter 20 and generating AC to be supplied to the battery 10.

According to a form of the present disclosure, the controller 100 may turn off a switching device included in one of the legs 21, 23, and 25 in the inverter 20 and may control an on/off state of switching devices included in the two remaining legs to convert polarity of a voltage applied to two of the coils L1 to L3, corresponding to a plurality of phases included in the motor 30, and thus AC may be supplied to the battery 10.

The amount of generated heat and the heat generation efficiency need to be considered when heat generated due to the internal resistance of the battery 10 is used to increase a temperature of the battery 10.

First, the amount of heat that is generated may be proportional to the amount of current flowing in the battery 10. That is, when a large amount of current flows irrespective of a direction of internal resistance of the battery 10, a large amount of heat may be generated. In consideration of this, a charge amount or a discharge amount may be increased by varying a charge for supplying DC to the battery 10 or a discharge for outputting DC from the battery 10, and thus the amount of heat in the battery 10 may be increased.

Then, in order to increase efficiency, charging and discharging of the battery 10 may be alternately performed instead of performing only one of charging or discharging of the battery 10. As such, when charging and discharging of the battery 10 are alternately performed, the energy consumed in the battery 10 is low but the amount of current flowing in the battery 10 is high, and thus, energy efficiency may be increased, and simultaneously, the amount of heat may be greatly increased. That is, when AC instead of DC is supplied to the battery 10, output of current from the battery 10 and input of current to the battery 10 may be repeatedly performed, and thus heating of the battery 10 with high energy efficiency may be induced.

In this case, when a frequency of AC is sufficiently high, heat may be generated from the battery 10 while inhibiting lithium inside the battery 10 from being precipitated and the battery from being aged.

In consideration of this, according to various forms of the present disclosure, the switching devices S1 to S6 in the inverter 20 may be controlled to supply AC having a high frequency to a battery 10.

In order to supply AC to the battery 10, it may be desired to receive and store energy from the battery 10 and to re-supply the stored energy to the battery 10. Here, according to various forms of the present disclosure, the coils L1 to L3 corresponding to a plurality of phases included in the motor 30 may be used to store the desired energy. That is, energy may be stored and discharged with respect to the coils L1 to L3 of the motor 30, and AC may be supplied to the battery 10.

In order to supply AC having a high frequency to the battery 10 using the inverter 20 and the motor 30, and to increase a temperature of the battery 10, battery current needs to be provided and generation of torque of the motor 30 needs to be suppressed as described above.

Figure 2:
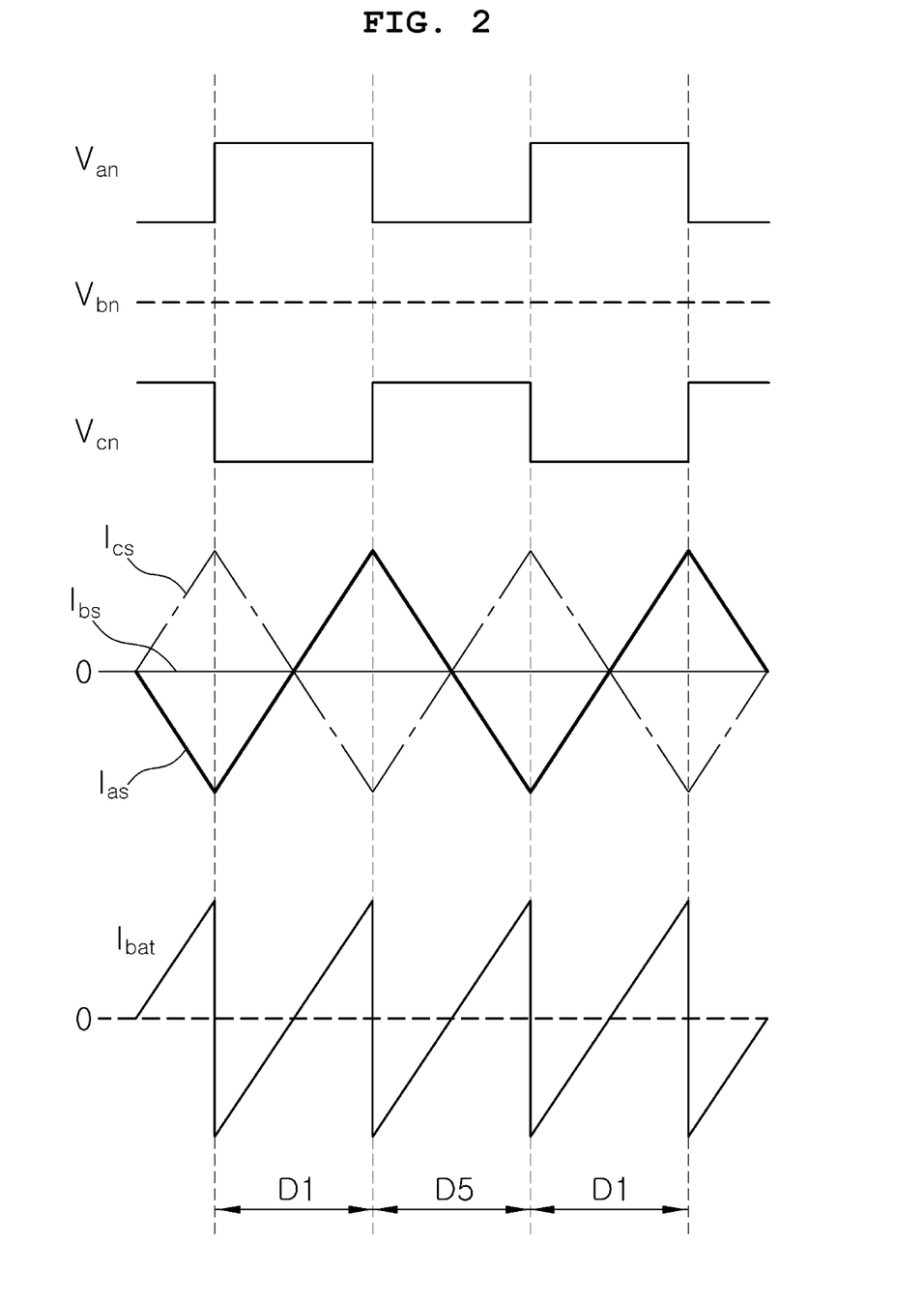
FIG. 2 is a waveform diagram for explaining a method of generating current of a battery in a motor driving system of FIG. 1.
Figure 3:
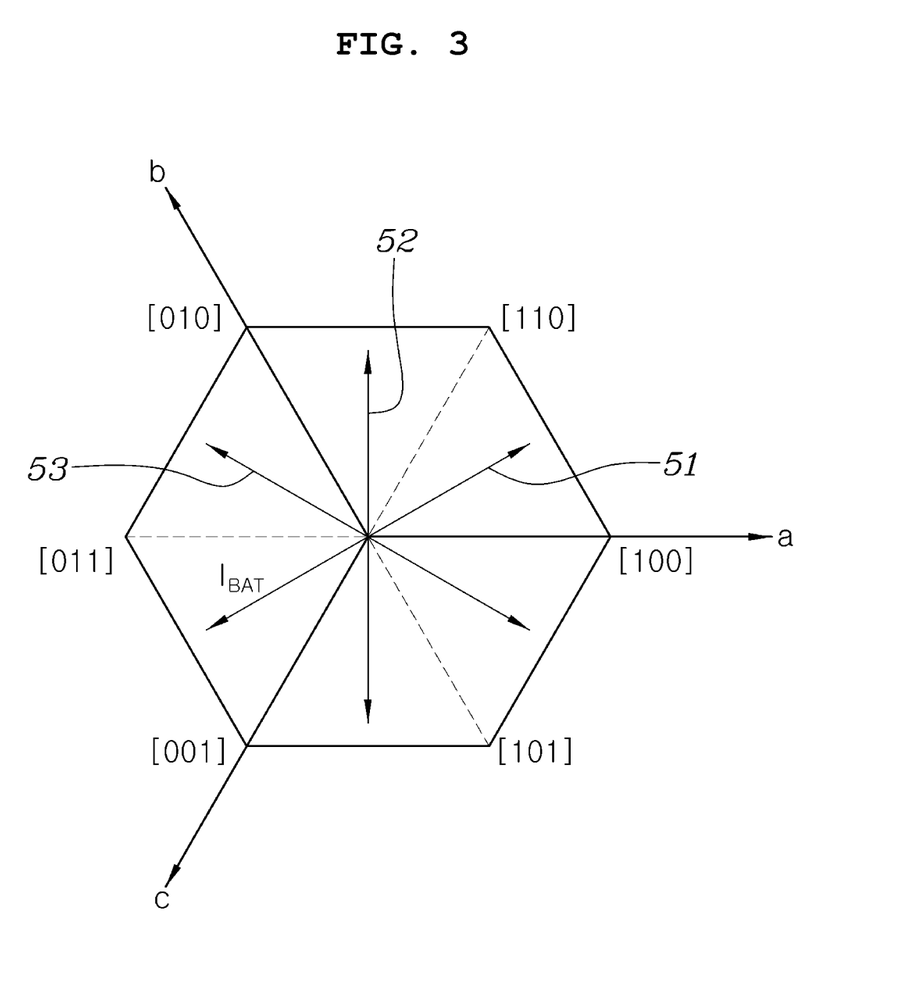
FIG. 3 is a vector diagram for explaining a method of reducing torque ripple in a motor driving system of FIG. 1.

FIG. 2 is a waveform diagram for explaining a method of generating current of a battery in a motor driving system and method according to a form of the present disclosure. FIG. 3 is a vector diagram for explaining a method of reducing torque ripple in the motor driving system and method according to a form of the present disclosure.

With reference to FIGS. 2 and 3, the method of generating AC supplied to the battery 10 and the method of suppressing torque generation of the motor 30 during a procedure of generating AC supplied to the battery 10 will be described in more detail.

First, referring to FIGS. 1 and 2, in a system for increasing a temperature of a battery used in a motor driving system according to a form of the present disclosure, the controller 100 may control an on/off state of switching devices included in two of three legs included in the inverter 20, and may turn off a switching device included in the one remaining leg. FIG. 2 shows an example in which the controller 100 controls an on/off state of the switching devices S1, S2, S5, and S6 included in the legs 21 and 25 connected to an a-phase coil L1 and a c-phase coil L3 of the motor 30 and turns off the switching devices S3 and S4 of the leg 23 connected to a b-phase coil L2.

In section 'D1' shown in FIG. 2, the controller 100 may control the switching devices S1, S2, S5, and S6 to make an a-phase voltage Va applied to the a-phase coil L1 of the motor 30 be a high state and to make a c-phase voltage Vc applied to the c-phase coil L3 be a low state. That is, the controller 100 may turn on the switching device S1 of the leg 21, may turn off the switching device S2, may turn off the switching device S5 of the leg 25, and may turn on the switching device S6.

Through this control, in the section D1, the a-phase coil L1 of the motor 30 may be connected to a positive (+) terminal of the battery 10, and thus current Ias flowing in the a-phase coil L1 of the motor 30 may increase and current Ics flowing in the c-phase coil L3 may decrease. Here, the currents Ias and Ics of respective phases may flow in a positive (+) direction to the motor 30 from the inverter 20. Due to the electrical properties of a coil (inductor) for storing energy, even if an electrical path is formed through switching of a switching device, the currents Ias and Ics flowing in the respective coils may gradually increase or decrease. Thus, the direction of current flowing in a previous section may be changed after being maintained for a predetermined time. Here, the coils L1, L2, and L3 of respective phases of the motor 30 may have one end connected to a connection node of one pair of switching devices included in each of the legs 21, 23, and 25 of the inverter 20 and the other end commonly connected to the coils L1, L2, and L3 to form a neutral point.

When a section 'D1' is changed to a section 'D5' according to a preset switching frequency, the controller 100 may control the switching devices S1, S2, S5, and S6 to make the c-phase voltage Vc applied to the c-phase coil L3 of the motor 30 be a high state and to make the a-phase voltage Va applied to the a-phase coil L1 be a low state. That is, the controller 100 may turn off the switching device S1 of the leg 21, may turn on the switching device S2, may turn on the switching device S5 of the leg 25, and may turn off the switching device S6.

Through this control, in a section D5, the c-phase coil L3 of the motor 30 may be connected to a positive (+) terminal of the battery 10, and thus the current Ics flowing in the c-phase coil L3 of the motor 30 may increase and the current Ias flowing in the a-phase coil L1 may decrease. As described above, according to the properties of the inductor, even if an on/off state of a switching device is changed in the section D5, the amplitude of current flowing in the previous section D1 may gradually decrease while the direction of the current is maintained for a predetermined time, and the direction of the current may be changed after a predetermined time elapses.

That is, when a switching section is changed, even if a connection state of a switching device is changed, current flow in a previous section is maintained for a predetermined time, and thus the battery 10 may become in a charge state of receiving current, and after a predetermined time elapses, the battery 10 may become in a discharge state of outputting current from the battery 10 until the switching device is next changed. Current of the battery, which is changed in this way, is indicated as 'Ibat' in FIG. 2. As shown in FIG. 2, the battery current Ibat may be AC that pulsates at a half-period of a switching period (D1+D5), that is, a frequency is twice of a switching frequency.

In summary, the system for increasing a temperature of a battery used in a motor driving system according to a form of the present disclosure may be configured in such a way that, as described and defined above, an on/off state of one pair of switching devices included in a leg connected to a coil corresponding to two of the plurality of phases is controlled to have a complementary relationship at a preset switching frequency, an on/off state of two switching devices connected to a positive terminal of the battery 10 in two legs connected to a coil corresponding to two phases is controlled to have a complementary relationship at a preset switching frequency, and a switching device in a leg connected to a coil corresponding to the remaining phases is turned off, and thus AC may be generated and supplied to the battery 10.

According to a form of the present disclosure, during a procedure of controlling the switching devices S1 to S6 for increasing a temperature of the battery 10, torque needs to be inhibited from being generated in the motor 30. As described above, in a method in which current is not supplied to a coil corresponding to one phase and current is supplied to a coil corresponding to the two remaining phases, current may be generated as indicated by the arrows 51, 52, and 53 shown in FIG. 3.

That is, when all switching devices of the leg 23 corresponding to the b-phase are turned off so as to avoid using the coil L2 corresponding to the b-phase, and the coils L1 and L3 of the motor 30, which correspond to the a-phase and the c-phase, are used, current may be generated as indicated by reference numeral '51' which corresponds to 0 (which is perpendicular to the b-axis) of a b-axis value. Similarly, when all switching devices of the leg 21 corresponding to the a-phase are turned off so as to avoid using the coil L1 corresponding to the a-phase, and the coils L2 and L3 of the motor 30, which correspond to the b-phase and the c-phase, are used, current may be generated as indicated by reference numeral '52' which corresponds to 0 (which is perpendicular to the a-axis) of an a-axis value. Similarly, when all switching devices of the leg 25 corresponding to the c-phase are turned off so as to avoid using the coil L3 corresponding to the c-phase, and the coils L1 and L2 of the motor 30, which correspond to the a-phase and the b-phase, are used, current may be generated as indicated by reference numeral '53', which corresponds to 0 (which is perpendicular to the c-axis) of a c-axis value. Here, the arrow indicated by reference numeral '51' may correspond to 30° and 210° based on the a-axis, the arrow indicated by reference numeral '52' may correspond to 90° and 270° based on the a-axis, and the arrow indicated by reference numeral '53' may correspond to 150° and 330° based on the a-axis.

In the case of a permanent magnet synchronous motor having saliency, torque generated in a motor according to current of the motor may be represented by Equation 1 below.

$$T_e = \frac{3}{2}\frac{P}{2}[\lambda_f + (L_d - L_q)i_d]i_q \qquad \text{[Equation 1]}$$

In Equation 1 above, Te is torque of a motor, λf is electromotive force of the motor, Ld and Lq are d-axis and q-axis inductance of the motor, and id and iq are d-axis and q-axis current supplied from the motor.

As seen from Equation 1 above, when q-axis current is 0 (iq=0), torque may not be generated by the motor. That is, when AC generated in the motor is not directed to the q-axis of a synchronous reference frame and is present only at the d-axis, torque may not be generated in the motor.

Thus, when the d-axis corresponding to an axis that connects n and s poles of a rotor of the motor 30, is aligned with the arrow in a dq rest frame shown in FIG. 3, that is, when the angle of the rotor corresponds to 30°, 90°, 150°, 210°, 270°, and 330°, which is the angle of the arrow shown in FIG. 3, torque of the motor 30 may be 0.

The position of the rotor of the motor 30 may be arbitrarily determined, and thus, according to a form of the present disclosure, two phases for reducing a difference between a rotor angle detected by a rotor position sensor 40 included in the motor 30 and an angle corresponding to AC generated by on/off control of switching devices of a leg corresponding to two phases may be selected, and on/off states of switching devices of the leg corresponding to the two selected phases may be controlled, thereby reducing the generation of torque.

Referring to FIG. 3, when the rotor angle is 0° to 60° and 180° to 240°, the c-phase leg and the a-phase leg corresponding to the arrow 51 may be selected, an on-off state of switching devices included in the c-phase leg and the a-phase leg may be alternately controlled at a preset switching frequency, and switching devices included in the b-phase leg may be turned off to generate AC.

When the rotor angle is 60° to 120° and 240° to 300°, the b-phase leg and the c-phase leg may be selected, an on-off state of switching devices included in the b-phase leg and the c-phase leg may be alternately controlled at a preset switching frequency, and switching devices included in the a-phase leg may be turned off to generate AC.

When the rotor angle is 120° to 180° and 300° to 360°, the a-phase leg and the b-phase leg may be selected, an on-off state of switching devices included in the a-phase leg and the b-phase leg may be alternately controlled at a preset switching frequency, and switching devices included in the c-phase leg may be turned off to generate AC.

The present disclosure provides a method of increasing a temperature of a battery using a system for increasing a temperature of a battery using the aforementioned motor driving system.

Figure 4:
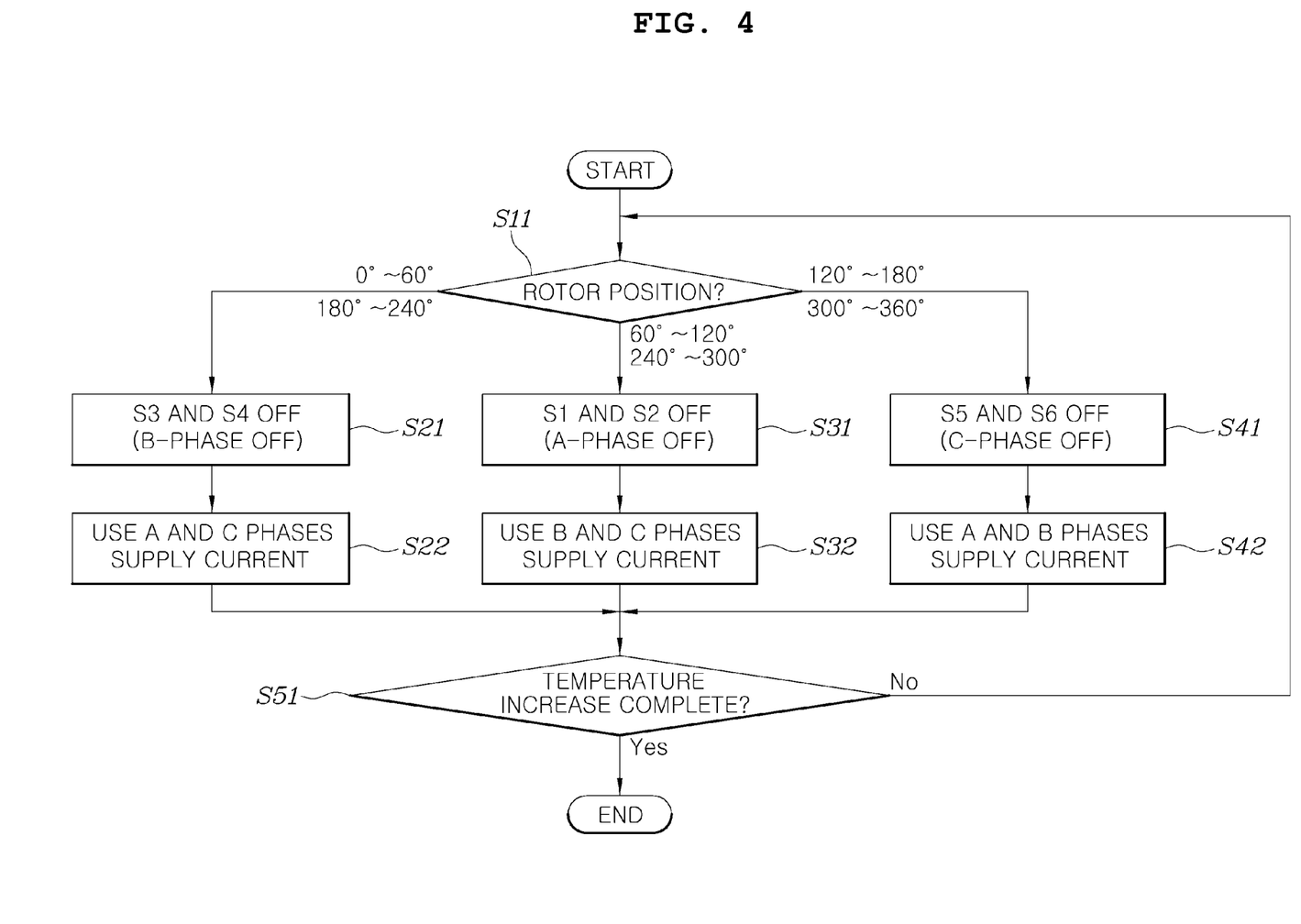
FIG. 4 is a flowchart of a method of increasing a temperature of a battery used in a motor driving system of FIG. 1.

FIG. 4 is a flowchart of a method of increasing a temperature of a battery used in a motor driving system according to a form of the present disclosure.

Referring to FIG. 4, the method of increasing a temperature of a battery used in a motor driving system according to a form of the present disclosure may include receiving a rotor angle of the motor 30 detected by the rotor position sensor 40 and determining a section to which the rotor angle belongs by the controller 100 (S11), determining a leg maintained in an off state based on the section to which the rotor angle belongs by the controller 100 (S21, S31, and S41), and alternately controlling an on-off state of switching devices included in a leg other than the leg maintained in an off state to generate AC by the controller 100 (S22, S32, and S42). The above operations may be repeatedly performed until a temperature Tbat of the battery increases to a preset target temperature (S51).

In operation S11, when the rotor angle is 0° to 60° and 180° to 240°, the controller 100 may turn off the switching devices S3 and S4 included in the b-phase leg 23 (S21) and may alternately control an on/off state of the switching devices S1, S2, S5, and S6 included in the c-phase leg 25 and the a-phase leg 21 may be controlled at a preset switching frequency to generate AC (S22).

In operation S22, the controller 100 may control states of one pair of switching devices S5 and S6 included in the c-phase leg 25 to have a complementary relationship at a preset switching frequency, and may control states of one pair of switching devices S1 and S2 included in the a-phase leg 21 to have a complementary relationship at a preset switching frequency. The controller 100 may control a state of the switching device S5 connected to a positive (+) terminal of the battery 10 among switching devices included in the c-phase leg 25 and a state of the switching device S1 connected to the positive terminal of the battery 10 among switching devices included in the a-phase leg 21 to have a complementary relationship at a switching frequency to generate AC to be supplied to the battery 10.

In operation S11, when the rotor angle is 60° to 120° and 240° to 300°, the controller 100 may turn off the switching devices S1 and S2 included in the a-phase leg 21 (S31) and may alternately control an on/off state of the switching devices S3, S4, S5, and S6 included in the b-phase leg 23 and the c-phase leg 25 at a preset switching frequency to generate AC (S32).

In operation S32, the controller 100 may control states of one pair of switching devices S3 and S4 included in the b-phase leg 23 to have a complementary relationship at a switching frequency and may control states of one pair of switching devices S5 and S6 included in the c-phase leg 25 to have a complementary relationship at a switching frequency. In addition, the controller 100 may control a state of the switching device S3 connected to the positive (+) terminal of the battery 10 among switching devices included in the b-phase leg 23 and a state of the switching device S5 connected to the positive terminal of the battery 10 among switching devices included in the c-phase leg 25 to have a complementary relationship at a switching frequency to generate AC supplied to the battery 10.

In operation S11, when the rotor angle is 120° to 180° and 300° to 360°, the controller 100 may turn off the switching devices S5 and S6 included in the c-phase leg 25 (S41) and may alternately control an on/off state of the switching devices S1, S2, S3, and S4 included in the a-phase leg 21 and the b-phase leg 23 at a preset switching frequency to generate AC (S42).

In operation S42, the controller 100 may control states of one pair of switching devices S1 and S2 included in the a-phase leg 21 to have a complementary relationship at a switching frequency and may control states of one pair of the switching devices S3 and S4 included in the b-phase leg 23 to have a complementary relationship at a switching frequency. The controller 100 may control a state of the switching device S1 connected to the positive (+) terminal of the battery 10 among switching devices included in the a-phase leg 21 and a state of the switching device S3 connected to the positive terminal of the battery 10 among switching devices included in the b-phase leg 23 to have a complementary relationship at a switching frequency to generate AC supplied to the battery 10.

As described above, the system and method for increasing a temperature of a battery used in a motor driving system according to various forms of the present disclosure may supply AC to the battery using an inverter and a motor which are connected to the battery configured to drive an eco-friendly vehicle without a separate temperature increasing device, and thus, may effectively increase a temperature of the battery without an additional cost.

In particular, when AC is generated by using the inverter and the motor in the system and method for increasing a temperature of a battery used in a motor driving system, torque pulsation generated in the motor may be inhibited as much as possible, thereby providing the stability of a vehicle.

The system and method for increasing a temperature of a battery used in a motor driving system may supply AC to the battery by using an inverter and a motor that are necessarily configured to drive an eco-friendly vehicle without a separate temperature increasing device such as a heater, and thus, may effectively increase a temperature of the battery without additional costs.

While the present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A system for increasing a temperature of a battery used in a motor driving system, the system comprising:
   an inverter comprising a plurality of legs each including one pair of switching devices connected in series to each other between opposite ends of the battery and corresponding to a plurality of phases, respectively;
   a motor comprising a plurality of coils corresponding to the plurality of phases, respectively, one end of each of the plurality of coils being connected to a connection node between the pair of switching devices included in a corresponding leg and other ends of the coils being connected to each other; and
   a controller configured to select two phases of the plurality of phases, and to generate alternating current (AC) supplied to the battery by alternately controlling an on/off state of the pair of switching devices included in each of two legs in the inverter, corresponding to the two selected phases, at a preset switching frequency,
   wherein the controller controls the on/off state of a first pair of switching devices included in a first leg corresponding to one phase of the two selected phases to have a complementary relationship at the preset switching frequency and controls the on/off state of a second pair of switching devices included in a second leg corresponding to a remaining phase of the two selected phases to have the complementary relationship at the preset switching frequency.

2. The system of claim 1,
   wherein the controller controls the on/off state of one switching device of the first pair of switching devices connected to a positive terminal of the battery in the first leg and the on/off state of one switching device of the second pair of switching devices connected to the positive terminal of the battery in the second leg to have the complementary relationship.

3. The system of claim 2, wherein the controller turns off a third pair of switching devices included in a third leg corresponding to a phase other than the two selected phases.

4. The system of claim 2, further comprising:
   a rotor position sensor configured to detect a rotor angle of the motor,
   wherein the controller selects the two phases of the plurality of phases based on the rotor angle.

5. The system of claim 4, wherein the controller selects the two phases for reducing a difference between the rotor angle and an angle of AC generated by control of the pair of switching devices included in each leg of the legs corresponding to the two phases among the plurality of phases, and the angle of the AC is indicated on a dq rest frame.

6. A system for increasing a temperature of a battery used in a motor driving system, the system comprising:
   an inverter comprising an a-phase leg, a b-phase leg, and a c-phase each leg including one pair of switching devices connected in series to each other between opposite ends of the battery;
   a motor comprising an a-phase coil having one end connected to a connection node between a first pair of switching devices included in the a-phase leg, a b-phase coil having one end connected to a connection node between a second pair of switching devices included in the b-phase leg, and a c-phase coil having one end connected to a connection node between a third pair of switching devices included in the c-phase leg, another end of the a-phase coil, another end of the b-phase coil, and another end of the c-phase coil being connected to each other; and
   a controller configured to select two legs among the a-phase leg, the b-phase leg, and the c-phase leg, and to generate AC supplied to the battery by alternately controlling an on/off state of the pair of switching devices included in the two legs at a preset switching frequency,
   wherein the controller controls the on/off state of one pair of switching devices included in one leg of the two legs to have a complementary relationship at the preset switching frequency and controls the on/off state of one pair of switching devices included in a remaining leg of the two legs to have the complementary relationship at the preset switching frequency.

7. The system of claim 6,
   wherein the controller controls the on/off state of one switching device of the pair of switching devices connected to a positive terminal of the battery in each leg of the two legs to have the complementary relationship.

8. The system of claim 6, wherein the controller turns off one pair of switching devices included in a leg that is not selected.

9. The system of claim 6, further comprising:
   a rotor position sensor configured to detect a rotor angle of the motor,
   wherein the controller selects the two legs based on the rotor angle.

10. The system of claim 9, wherein the controller selects the two legs for reducing a difference between the rotor angle and an angle of AC generated by control of the first pair of switching devices and the second pair of switching devices included in each leg of the a-phase leg and the b-phase leg, AC generated by control of the second pair of switching devices and the third pair of switching devices included in each leg of the b-phase leg and the c-phase leg, and AC generated by control of the third pair of switching devices and the first pair of switching devices included in each leg of the c-phase leg and the a-phase leg, and the angle of the AC is indicated on a dq rest frame.

11. The system of claim 9, wherein, when the rotor angle is 0° to 60° and 180° to 240°, the controller selects the c-phase leg and the a-phase leg, alternately controls the on/off state of the third pair of switching devices and the first pair of switching devices included in each leg of the c-phase leg and the a-phase leg at the preset switching frequency, and turns off the second pair of switching devices included in the b-phase leg to generate the AC.

12. The system of claim 9, wherein, when the rotor angle is 60° to 120° and 240° to 300°, the controller selects the b-phase leg and the c-phase leg, alternately controls the on/off state of the second pair of switching devices and the third pair of switching devices included in each of the b-phase leg and the c-phase leg at the preset switching frequency, and turns off the first pair of switching devices included in the a-phase leg to generate the AC.

13. The system of claim 9, wherein, when the rotor angle is 120° to 180° and 300° to 360°, the controller selects the a-phase leg and the b-phase leg, alternately controls the on/off state of the first pair of switching devices and the second pair of switching devices included in each of the a-phase leg and the b-phase leg at the preset switching frequency, and turns off the third pair of switching devices included in the c-phase leg to generate the AC.

14. A method of increasing a temperature of a battery, the method comprising:
   providing a system comprising: (1) an inverter comprising an a-phase leg, a b-phase leg, and a c-phase leg, each leg including one pair of switching devices connected in series to each other between opposite ends of the battery; (2) a motor comprising an a-phase coil having one end connected to a connection node between a first pair of switching devices included in the a-phase leg, a b-phase coil having one end connected to a connection node between a second pair of switching devices included in the b-phase leg, and a c-phase coil having one end connected to a connection node between a third pair of switching devices included in the c-phase leg, another end of the a-phase coil, another end of the b-phase coil, and another end of the c-phase coil being connected to each other; (3) a controller; and (4) a rotor position sensor;
   determining, using the rotor position sensor of the system, a section of the motor to which the rotor angle belongs;
   determining one of the legs maintained in an off state based on the section to which the rotor angle belongs;
   selecting, by the controller of the system, two legs among the a-phase leg, the b-phase leg, and the c-phase leg, wherein the two legs are the legs other than the leg maintained in the off state at a preset switching frequency; and
   generating an alternating current (AC) by alternately controlling an on/off state of the pair of switching devices included in two legs other than the leg maintained in the off state at the preset switching frequency.

15. The method of claim 14, wherein the determining of the section is performed when the rotor angle is 0° to 60° and 180° to 240°;
   wherein the determining of the section comprises turning off the second pair of switching devices included in the b-phase leg; and
   wherein the generating comprises generating the AC by alternately controlling an on/off state of the third pair of switching devices and the first pair of switching devices included in each leg of the c-phase leg and the a-phase leg at the preset switching frequency.

16. The method of claim 15, wherein the generating comprises:
   controlling the on/off state of the third pair of switching devices included in the c-phase leg to have a complementary relationship at the preset switching frequency;
   controlling the on/off state of the first pair of switching devices included in the a-phase leg to have the complementary relationship at the preset switching frequency; and
   controlling the on/off state of one of the third pair of switching devices connected to a positive terminal of the battery in the c-phase leg and the on/off state of one of the first pair of switching devices connected to the positive terminal of the battery in the a-phase leg to have the complementary relationship at the preset switching frequency.

17. The method of claim 14, wherein the determining of the section is performed when the rotor angle is 60° to 120° and 240° to 300';
   wherein the determining of the section comprises turning off the first pair of switching devices included in the a-phase leg; and
   wherein the generating comprises generating the AC by alternately controlling an on/off state of the second pair of switching devices and the third pair of switching devices included in each leg of the b-phase leg and the c-phase leg at the preset switching frequency.

18. The method of claim 17, wherein the generating further comprises:
   controlling the on/off state of the second pair of switching devices included in the b-phase leg to have a complementary relationship at the preset switching frequency;
   controlling the on/off state of the third pair of switching devices included in the c-phase leg to have the complementary relationship at the preset switching frequency; and
   controlling the on/off state of one of the second pair of switching devices connected to a positive terminal of the battery in the b-phase leg and the on/off state of one of the third pair of switching devices connected to the positive terminal of the battery in the c-phase leg to have the complementary relationship at the preset switching frequency.

19. The method of claim 14, wherein the determining of the section is performed when the rotor angle is 120° to 180° and 300° to 360°;
   wherein the determining of the section comprises turning off the third pair of switching devices included in the c-phase leg; and
   wherein the generating comprises generating the AC by alternately controlling an on/off state of the first pair of switching devices and the second pair of switching devices included in each leg of the a-phase leg and the b-phase leg at the preset switching frequency.

20. The method of claim 19, wherein the generating further comprises:
   controlling the on/off state of the first pair of switching devices included in the a-phase leg to have a complementary relationship at the preset switching frequency;
   controlling the on/off state of the second pair of switching devices included in the b-phase leg to have the complementary relationship at the preset switching frequency; and
   controlling the on/off state of one of the first pair of switching devices connected to a positive terminal of the battery in the a-phase leg and the on/off state of one of the second pair of switching devices connected to the positive terminal of the battery in the b-phase leg to have the complementary relationship at the preset switching frequency.

\* \* \* \* \*